US012747797B2

(12) United States Patent
Asano et al.

(10) Patent No.: US 12,747,797 B2
(45) Date of Patent: Sep. 29, 2026

(54) VALVE DEVICE

(71) Applicant: DENSO CORPORATION, Kariya-city (JP)

(72) Inventors: Naoki Asano, Kariya-city (JP); Takuya Hamada, Kariya-city (JP); Atsushi Tanaka, Kariya-city (JP); Ryo Sano, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 483 days.

(21) Appl. No.: 18/469,283

(22) Filed: Sep. 18, 2023

(65) Prior Publication Data

US 2024/0003439 A1 Jan. 4, 2024

Related U.S. Application Data

(63) Continuation of application No. PCT/JP2022/015519, filed on Mar. 29, 2022.

(30) Foreign Application Priority Data

Apr. 21, 2021 (JP) ................................ 2021-071789

(51) Int. Cl.
*F16K 11/074* (2006.01)
*F01P 3/20* (2006.01)
(Continued)

(52) U.S. Cl.
CPC .............. *F16K 11/074* (2013.01); *F01P 3/20* (2013.01); *F01P 7/165* (2013.01); *F16K 27/045* (2013.01); *F16K 31/041* (2013.01)

(58) Field of Classification Search
CPC .... F16K 11/074; F16K 31/041; F16K 27/045; F01P 3/20; F01P 7/165
See application file for complete search history.

(56) References Cited

U.S. PATENT DOCUMENTS 3,934,612 A * 1/1976 Kast .......................... F16K 3/32
137/625.3
5,044,605 A * 9/1991 Korfgen ................ F16K 27/045
251/304
(Continued)

FOREIGN PATENT DOCUMENTS

WO WO-2021049542 A1 * 3/2021 ........... F16K 31/535

OTHER PUBLICATIONS

WO-2021049542-A1 machine translation, published Mar. 18, 2021.*
(Continued)

*Primary Examiner* — Craig M Schneider
*Assistant Examiner* — Christopher D Ballman
(74) *Attorney, Agent, or Firm* — Nixon & Vanderhye P.C.

(57) ABSTRACT

A valve device may include: a shaft which has a shaft central axis; a stationary disk; a rotor; a housing which has a housing central axis and an opening; a housing cover which closes the opening; and a seal member. The seal member is eccentric with respect to the shaft central axis in conformity with the amount of eccentricity between the shaft central axis and the housing central axis. A valve device may include: a drive device; a shaft which has a shaft central axis; a stationary disk; a rotor; a housing which has a housing central axis and an opening; a drive device case which closes the opening and receives the drive device; and a seal member. The seal member is eccentric with respect to the shaft central axis in conformity with the amount of eccentricity between the shaft central axis and the housing central axis.

10 Claims, 6 Drawing Sheets

(51) Int. Cl.

| | |
|---|---|
| ***F01P 7/16*** | (2006.01) |
| ***F16K 27/04*** | (2006.01) |
| ***F16K 31/04*** | (2006.01) |

(56) References Cited

U.S. PATENT DOCUMENTS

| | | | | |
|---|---|---|---|---|
| 5,219,148 | A * | 6/1993 | Weyand | F16K 3/08 251/192 |
| 10,781,932 | B2 * | 9/2020 | Yokoe | F16K 11/0743 |
| 11,156,306 | B2 * | 10/2021 | Yokoe | F16K 31/043 |
| 2015/0233483 | A1 | 8/2015 | Bachofer | |
| 2016/0218602 | A1 * | 7/2016 | Fukushima | H02K 11/225 |
| 2017/0370492 | A1 * | 12/2017 | Obrist | F16K 3/34 |
| 2019/0301619 | A1 * | 10/2019 | Wu | F16K 3/314 |
| 2021/0088149 | A1 * | 3/2021 | Nomura | F16K 27/067 |
| 2022/0196157 | A1 | 6/2022 | Mizunuma et al. | |

OTHER PUBLICATIONS

U.S. Appl. No. 18/469,218 to Ryo Sano, filed Mar. 27, 2023 (48 pages).

U.S. Appl. No. 18/469,218 to Takuya Hamada, filed Mar. 27, 2023 (50 pages).

U.S. Appl. No. 18/469,218 to Atsushi Tanaka, filed Sep. 18, 2023 (63 pages).

U.S. Appl. No. 18/469,218 to Yoshitada Aono, filed Sep. 18, 2023 (63 pages).

U.S. Appl. No. 18/469,218 to Ryo Sano, filed Sep. 18, 2023 (54 pages).

U.S. Appl. No. 18/469,218 to Shota Kimura, filed Sep. 18, 2023 (59 pages).

U.S. Appl. No. 18/469,218 to Takuya Hamada, filed Sep. 18, 2023 (53 pages).

U.S. Appl. No. 18/469,218 to Takehito Mizunuma, filed Sep. 18, 2023 (61 pages).

* cited by examiner

VALVE DEVICE

CROSS REFERENCE TO RELATED APPLICATIONS

This application is a continuation application of International Patent Application No. PCT/JP2022/015519 filed on Mar. 29, 2022, which designated the U.S. and claims the benefit of priority from Japanese Patent Application No. 2021-071789 filed on Apr. 21, 2021. The entire disclosures of all of the above applications are incorporated herein by reference.

TECHNICAL FIELD

The present disclosure relates to a valve device.

BACKGROUND

Previously, there is proposed a valve device that has: a shaft, which extends in an axial direction of a predetermined central axis at an inside of a receiving space formed by a housing and a housing cover; a sealing disk; and a valve disk. This valve device is configured such that a recess, which is formed at the sealing disk, is fitted to a projection, which is formed at the housing, to limit rotation of the sealing disk. Furthermore, this valve device has an O-ring which is installed at a gap between the housing and the housing cover to limit leakage of the fluid from this gap.

The projection, which is formed at the housing, projects in the axial direction of the predetermined central axis. Furthermore, the recess, which is formed at the sealing disk, is placed at a location where the recess overlaps with the projection in the axial direction of the predetermined central axis. Furthermore, a passage hole, through which a fluid flows, extends through the sealing disk in the axial direction of the predetermined central axis at a location where the recess is not formed. The sealing disk serves as a stationary disk.

SUMMARY

This section provides a general summary of the disclosure, and is not a comprehensive disclosure of its full scope or all of its features.

According to the present disclosure, there is provided a valve device that includes a drive device, a shaft, a stationary disk, a rotor, a housing, an opening closure portion and a seal member. The drive device is configured to output a rotational force. The shaft is configured to be rotated about a shaft central axis by the rotational force outputted from the drive device. The stationary disk has at least one passage hole which is configured to conduct a fluid through the at least one passage hole. The rotor is configured to be rotated about the shaft central axis in response to rotation of the shaft to adjust a flow rate of the fluid flowing in the at least one passage hole. The housing is shaped in a bottomed tubular form and has a housing central axis which extends along the shaft central axis. The housing has a peripheral wall which surrounds the housing central axis and receives the stationary disk and the rotor while an opening is formed at the peripheral wall on one side in an axial direction of the housing central axis. The opening closure portion corresponds to a shape of the opening and closes the opening. The seal member is shaped in a ring form and seals a gap between the peripheral wall and the opening closure portion. The stationary disk has a stationary outer periphery which is opposed to the peripheral wall. The stationary outer periphery has a rotation stop projection which radially projects toward an inner periphery of the peripheral wall. The housing has a receiving groove which is formed at the inner periphery of the peripheral wall and receives the rotation stop projection. The housing central axis is positioned at a location where the housing central axis is eccentric with respect to the shaft central axis. The seal member is eccentric with respect to the shaft central axis, and thereby a distance, which is measured between the housing central axis and a center of the seal member along a cross section of the seal member that is perpendicular to the axial direction of the housing central axis, is smaller than an amount of eccentricity between the shaft central axis and the housing central axis.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
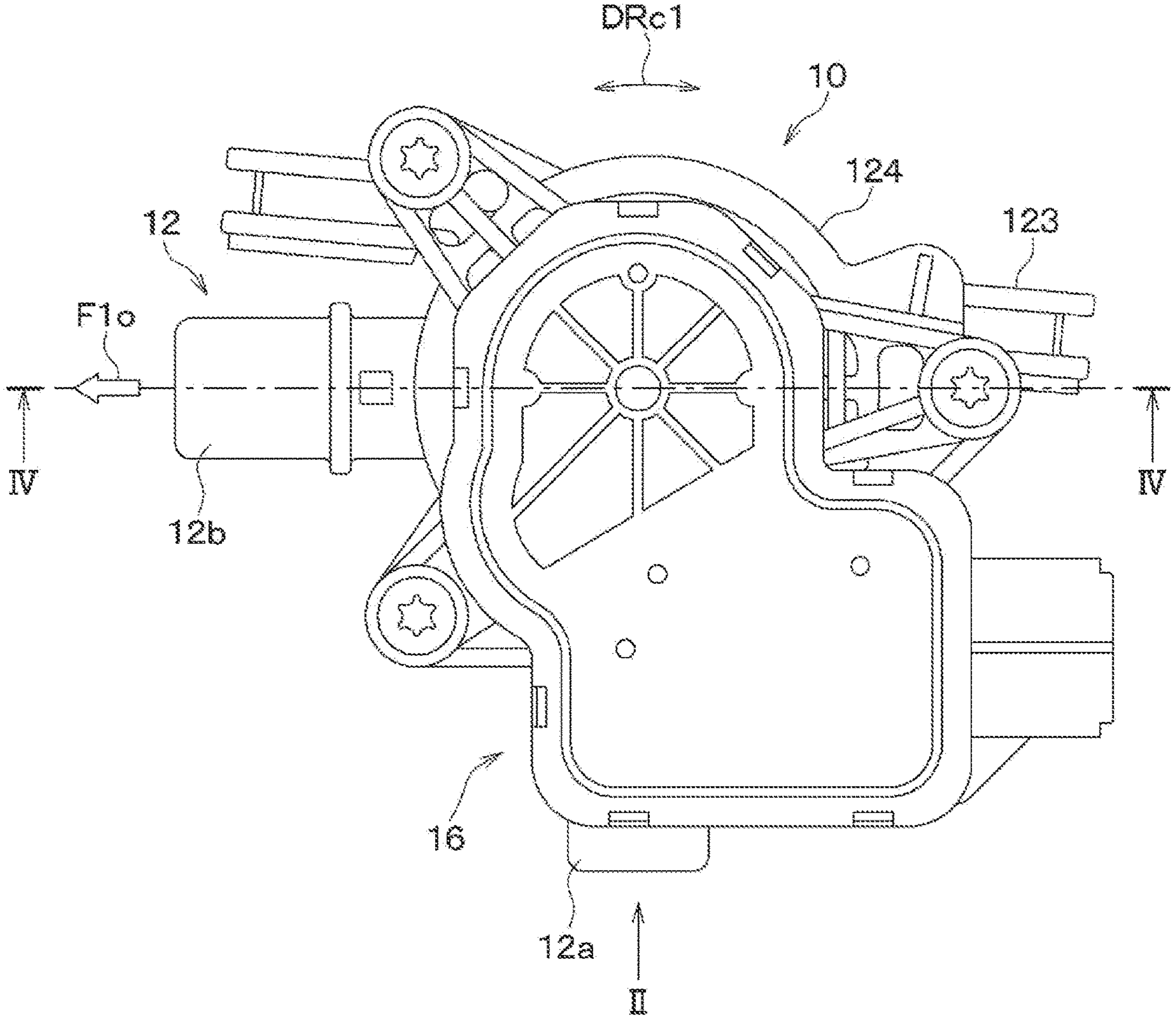
FIG. 1 is a top view of a valve device of an embodiment.

Previously, there is proposed a valve device that has: a shaft, which extends in an axial direction of a predetermined central axis at an inside of a receiving space formed by a housing and a housing cover; a sealing disk; and a valve disk. This valve device is configured such that a recess, which is formed at the sealing disk, is fitted to a projection, which is formed at the housing, to limit rotation of the sealing disk. Furthermore, this valve device has an O-ring which is installed at a gap between the housing and the housing cover to limit leakage of the fluid from this gap.

The projection, which is formed at the housing, projects in the axial direction of the predetermined central axis. Furthermore, the recess, which is formed at the sealing disk, is placed at a location where the recess overlaps with the projection in the axial direction of the predetermined central axis. Furthermore, a passage hole, through which a fluid flows, extends through the sealing disk in the axial direction of the predetermined central axis at a location where the recess is not formed. The sealing disk serves as a stationary disk.

As discussed above, in the above-described valve device, a fitting direction, in which the projection of the housing and the recess of the stationary disk are fitted together, coincides with a flow direction of the fluid which flows through the stationary disk, and the passage hole is positioned to avoid the recess. Thus, a range, in which the passage hole can be formed in the stationary disk, is limited. Therefore, this will result in that the location of the fluid passage formed at the inside of the valve device is limited.

In view of the above point, the inventors of the present application have studied to limit rotation of the stationary disk by providing a rotation stop projection, which projects from an outer periphery of the stationary disk toward an inner periphery of the housing, and fitting the rotation stop projection into a receiving groove, which is formed at the inner periphery of the housing.

According to the diligent study of the inventors, it is found that in order to receive the stationary disk, which has the rotation stop projection, at the inside of the housing, the receiving groove needs to extend in the axial direction of the predetermined central axis along the housing from the opening of the housing to a location that is opposed to the stationary disk. However, when the receiving groove is formed at the location where the housing opens, a gap is formed between a seal member, which is the O-ring, and the receiving groove, and the fluid may possibly leak from this gap.

Therefore, the inventors of the present application have further diligently studied a method for forming the receiving groove only at the location which is opposed to the stationary disk by increasing an inner diameter of a portion of the housing, which does not form the receiving groove, by the amount that corresponds to a size of the rotation stop projection, in comparison to a portion of the housing, which forms the receiving groove. With this configuration, the rotation stop projection does not interfere with the inner periphery of the housing at the time of receiving the stationary disk at the inside of the housing.

A sufficient wall thickness of the housing needs to be ensured in view of the strength of the housing. However, according to the above-described method, an outer diameter of the housing needs to be increased when the inner diameter of the housing is increased. An increase in the outer diameter of the housing causes an increase in a size of the whole valve device. Furthermore, in response to the increase in the inner diameter of the housing, an outer diameter and an inner diameter of the seal member, which seals a gap between the housing and the housing cover, need to be increased, and this is not desirable.

According to one aspect of the present disclosure, there is provided a valve device including:

- a drive device that is configured to output a rotational force;
- a shaft that is configured to be rotated about a shaft central axis by the rotational force outputted from the drive device;
- a stationary disk that has at least one passage hole which is configured to conduct a fluid through the at least one passage hole;
- a rotor that is configured to be rotated about the shaft central axis in response to rotation of the shaft to adjust a flow rate of the fluid flowing in the at least one passage hole;
- a housing that is shaped in a bottomed tubular form and has a housing central axis which extends along the shaft central axis, wherein the housing has a peripheral wall which surrounds the housing central axis and receives the stationary disk and the rotor while an opening is formed at the peripheral wall on one side in an axial direction of the housing central axis;
- a housing cover that has an opening closure portion, wherein the opening closure portion corresponds to a shape of the opening and closes the opening; and
- a seal member that is shaped in a ring form and seals a gap between the peripheral wall and the opening closure portion, wherein:
- the stationary disk has a stationary outer periphery which is opposed to the peripheral wall, wherein the stationary outer periphery has a rotation stop projection which radially projects toward an inner periphery of the peripheral wall;
- the housing has a receiving groove which is formed at the inner periphery of the peripheral wall and receives the rotation stop projection, wherein the housing central axis is positioned at a location where the housing central axis is eccentric with respect to the shaft central axis; and
- the seal member is eccentric with respect to the shaft central axis, and thereby a distance, which is measured between the housing central axis and a center of the seal member along a cross section of the seal member that is perpendicular to the axial direction of the housing central axis, is smaller than an amount of eccentricity between the shaft central axis and the housing central axis.

According to another aspect of the present disclosure, there is provided a valve device including:

- a drive device that is configured to output a rotational force;
- a shaft that is configured to be rotated about a shaft central axis by the rotational force outputted from the drive device;
- a stationary disk that has at least one passage hole which is configured to conduct a fluid through the at least one passage hole;
- a rotor that is configured to be rotated about the shaft central axis in response to rotation of the shaft to adjust a flow rate of the fluid flowing in the at least one passage hole;
- a housing that is shaped in a bottomed tubular form and has a housing central axis which extends along the shaft central axis, wherein the housing has a peripheral wall which surrounds the housing central axis and receives the stationary disk and the rotor while an opening is formed at the peripheral wall on one side in an axial direction of the housing central axis;
- a drive device case that receives the drive device and has an opening closure portion, wherein the opening closure portion corresponds to a shape of the opening and closes the opening; and
- a seal member that is shaped in a ring form and seals a gap between the peripheral wall and the opening closure portion, wherein:
- the stationary disk has a stationary outer periphery which is opposed to the peripheral wall, wherein the stationary outer periphery has a rotation stop projection which radially projects toward an inner periphery of the peripheral wall;
- the housing has a receiving groove which is formed at the inner periphery of the peripheral wall and receives the rotation stop projection, wherein the housing central axis is positioned at a location where the housing central axis is eccentric with respect to the shaft central axis; and
- the seal member is eccentric with respect to the shaft central axis, and thereby a distance, which is measured between the housing central axis and a center of the seal member along a cross section of the seal member that is perpendicular to the axial direction of the housing central axis, is smaller than an amount of eccentricity between the shaft central axis and the housing central axis.

According to the above configurations, by eccentrically displacing the housing central axis relative to the shaft central axis, it is possible to limit an increase in an overall size of the valve device caused by formation of the receiving groove while ensuring a sufficient wall thickness of the housing.

Furthermore, the seal member is eccentric with respect to the shaft central axis such that the distance between the housing central axis and the center of the seal member is reduced in comparison to the amount of eccentricity of between the shaft central axis and the housing central axis. Therefore, leakage of the fluid caused by the formation of the receiving groove can be limited, and an increase in a size of the seal member can be limited in comparison to a case where the seal member is not eccentric with respect to the shaft central axis.

Hereinafter, an embodiment of the present disclosure will be described with reference to FIGS. 1 to 5. In the present embodiment, there will be described an example where a valve device 10 of the present disclosure is applied to a temperature adjusting device that is for air conditioning of a vehicle cabin and is also for temperature control of a battery at an electric vehicle. The valve device 10, which is used in the temperature adjusting device of the electric vehicle, is required to execute fine adjustment of the temperature according to a state of the vehicle cabin and a state of the battery and is required to accurately adjust a flow rate of a fluid in comparison to a coolant circuit of an internal combustion engine.

The valve device 10 shown in FIG. 1 is applied to a fluid circuit in which the fluid (in this example, coolant) for adjusting the temperature of the vehicle cabin and the temperature of the battery is circulated to adjust the temperature of the vehicle cabin and the temperature of the battery. The valve device 10 can increase or decrease the flow rate of the fluid in a flow path through the valve device 10 in the fluid circuit, and the valve device 10 can also shut off the flow of the fluid in the flow path. For example, an LLC, which contains ethylene glycol, is used as the fluid. Here, LLC stands for Long Life Coolant.

Figure 2:
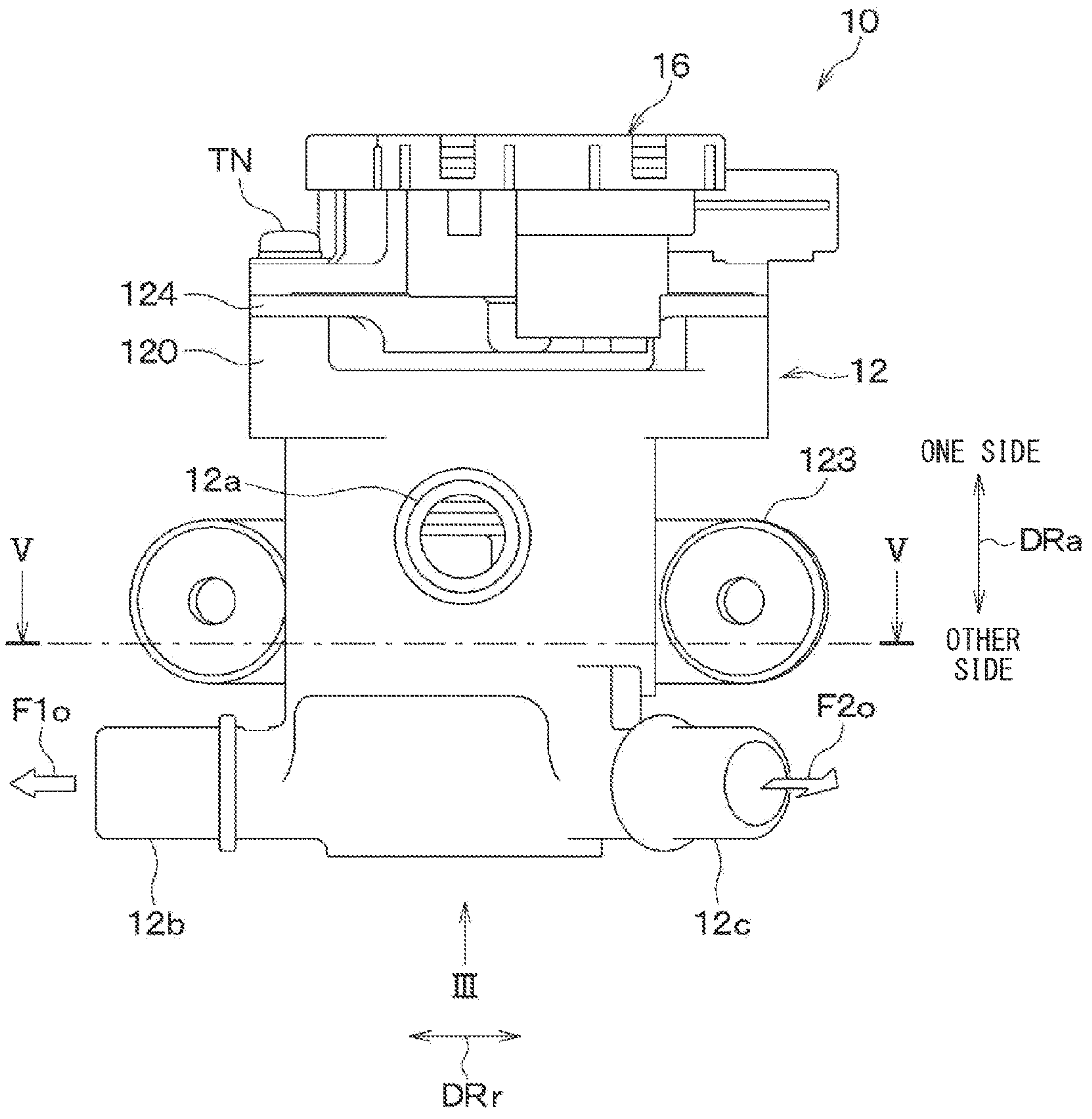
FIG. 2 is a front view of the valve device seen in a direction of an arrow II in FIG. 1.
Figure 3:
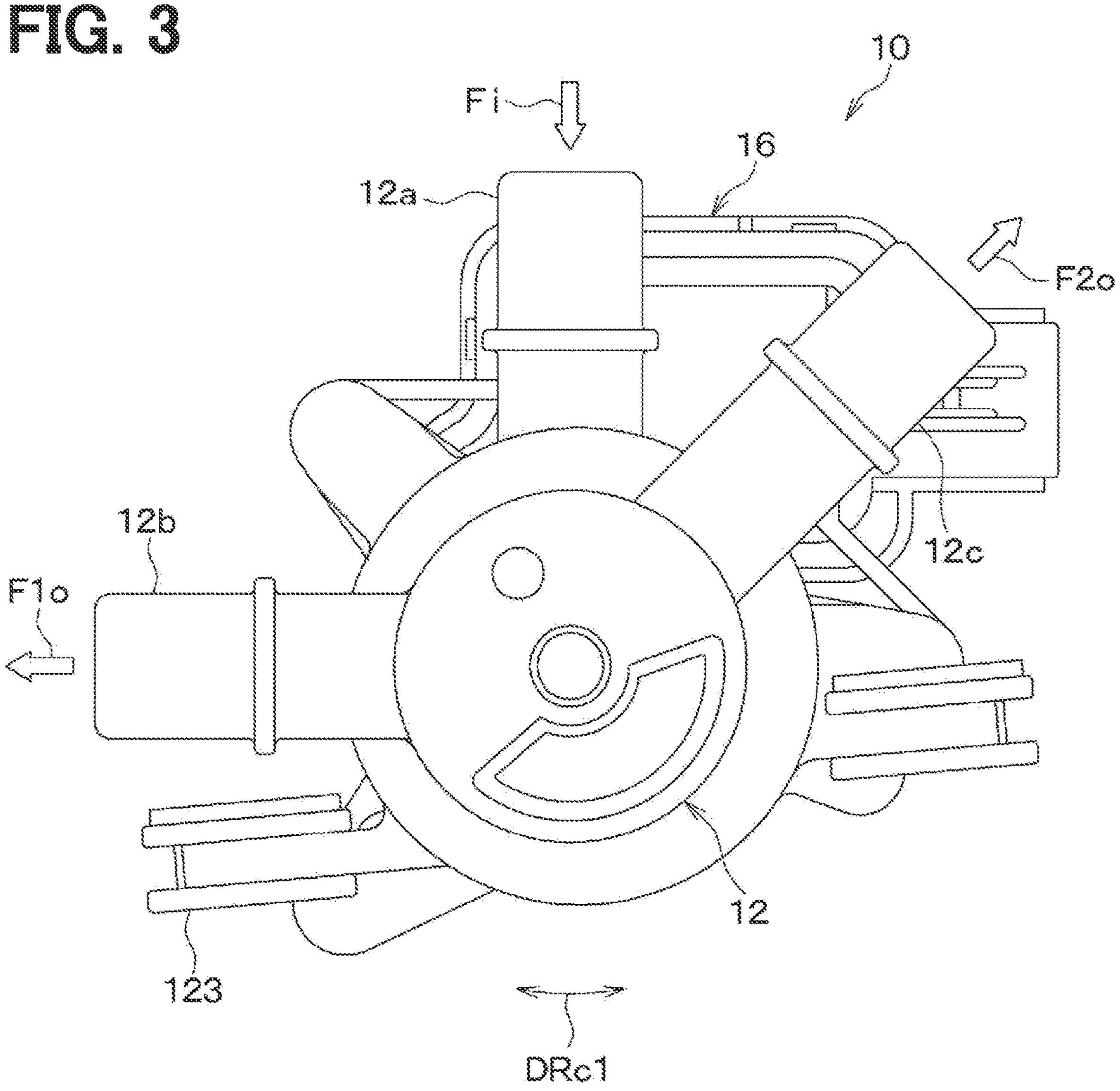
FIG. 3 is a bottom view of the valve device seen in a direction of an arrow III in FIG. 2.

As sown in FIGS. 1 to 3, the valve device 10 includes a housing 12 that forms a fluid passage that is formed at an inside of the housing 12 and conducts the fluid therethrough. The valve device 10 is a three-way valve and has an inlet 12*a* for inputting the fluid, a first outlet 12*b* for outputting the fluid, and a second outlet 12*c* for outputting the fluid while the inlet 12*a*, the first outlet 12*b* and the second outlet 12*c* are formed at the housing 12. The valve device 10 functions not only as a flow-path switching valve but also as a flow-rate adjusting valve for adjusting a flow rate ratio between the fluid flowing from the inlet 12*a* to the first outlet 12*b* and the fluid flowing from the inlet 12*a* to the second outlet 12*c*.

The valve device 10 is a disc valve that performs a valve opening/closing operation by rotating a valve element, which is shaped in a form of a circular disk, around a shaft central axis CL1 of a shaft 18 described later.

Figure 4:
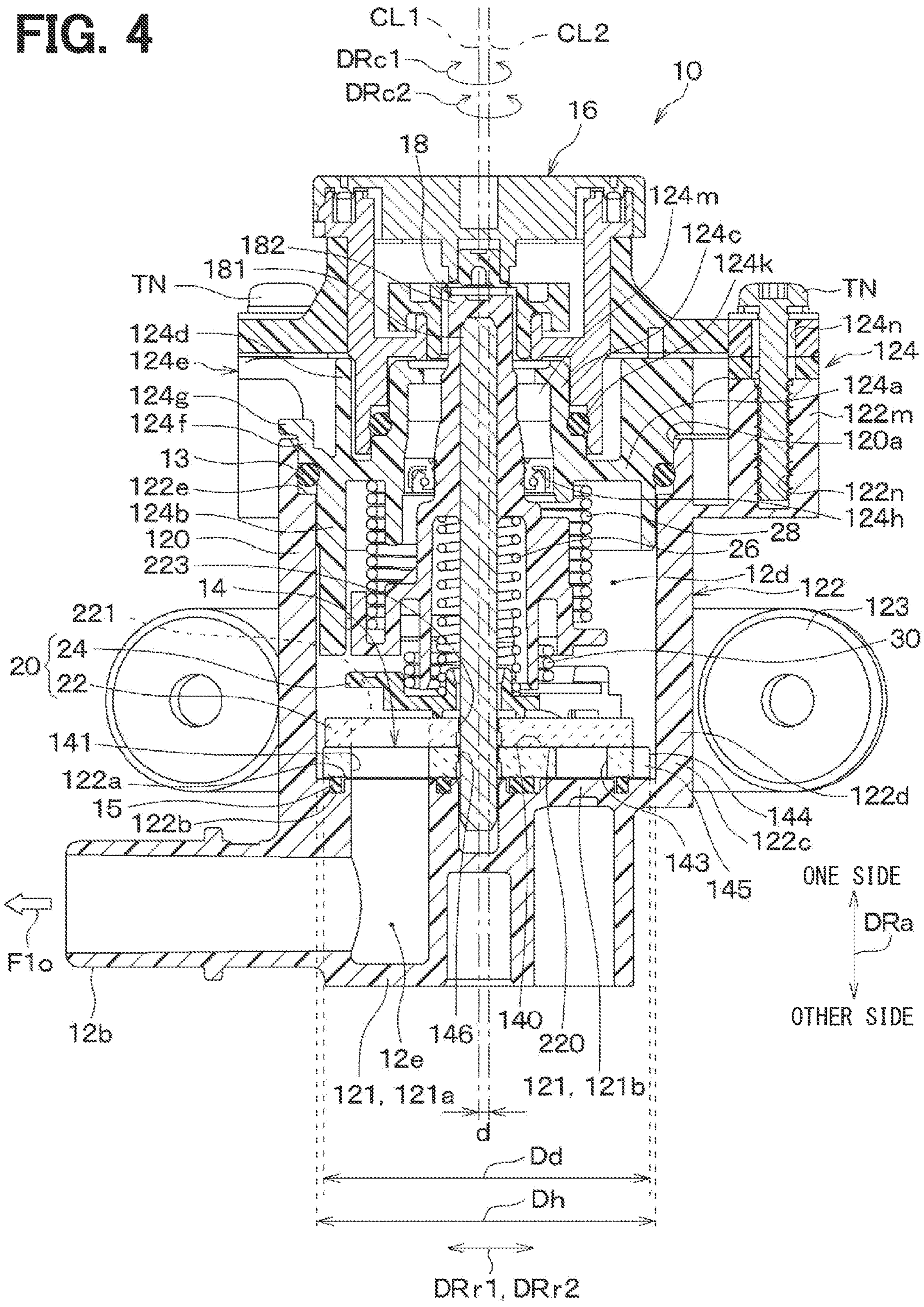
FIG. 4 is a cross-sectional view taken along line IV-IV in FIG. 1.
Figure 5:
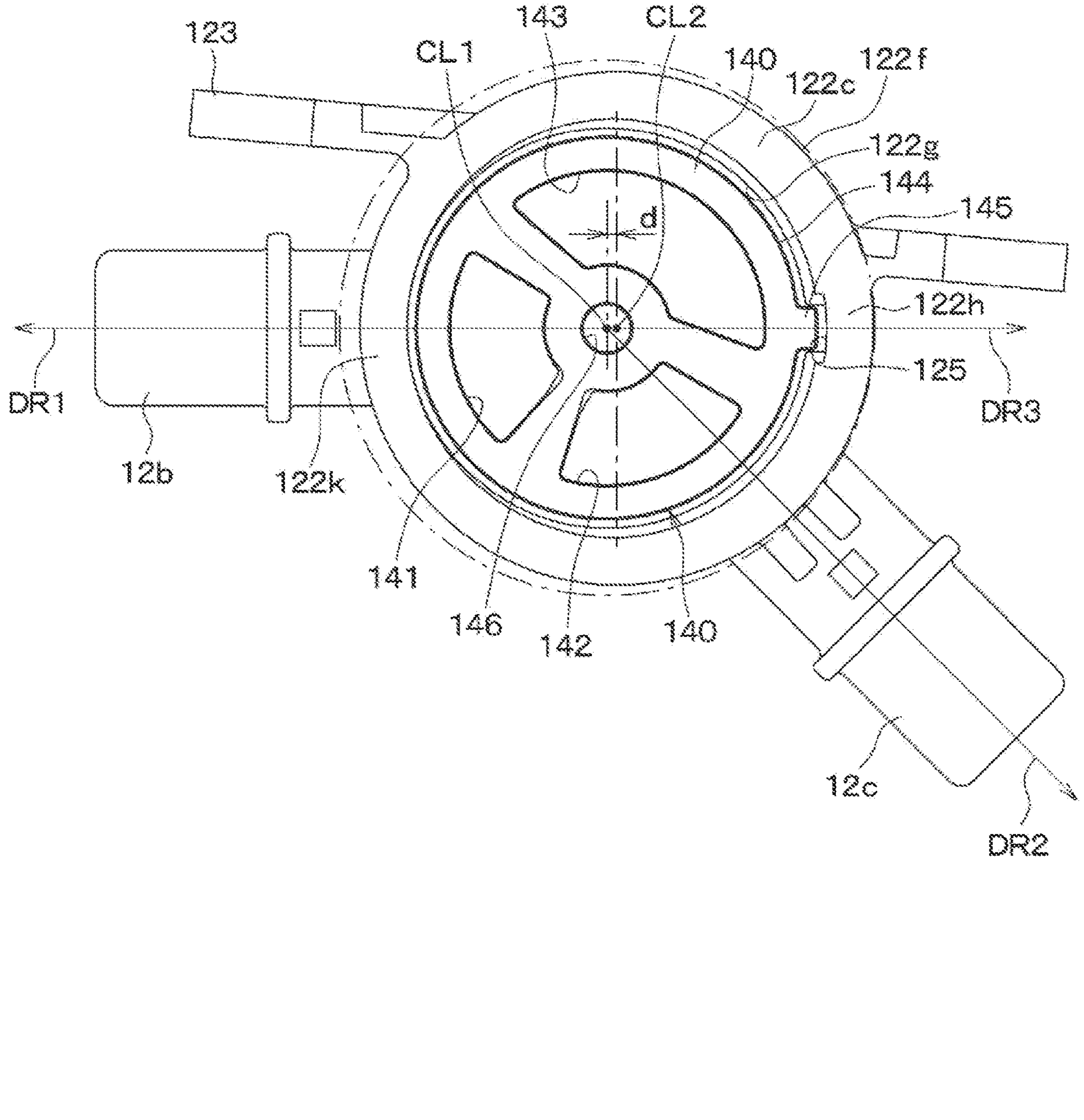
FIG. 5 is a cross-sectional view taken along line V-V in FIG. 2.

As shown in FIGS. 4 and 5, the valve device 10 includes a stationary disk 14, the shaft 18, a rotor 20, a compression spring 26, a first torsion spring 28 and a second torsion spring 30 which are received at the inside of the housing 12. Furthermore, the valve device 10 includes the drive device 16 which is placed at an outside of the housing 12.

The housing 12 is a non-rotatable member that is not rotated. The housing 12 is made of, for example, a resin material. The housing 12 includes a main body 120 and a main-body cover 124. The main body 120 is shaped in a bottomed tubular form and has a housing central axis CL2. The main-body cover 124 closes an opening 120*a* of the main body 120 which is located on one side in an axial direction DRa. In the present embodiment, the main body 120 and the main-body cover 124 are formed separately as separate members. Furthermore, in the present embodiment, the main-body cover 124 serves as a housing cover.

In the present embodiment, a direction, which is along the shaft central axis CL1 of the shaft 18 and the housing central axis CL2 of the main body 120, will be referred to as the axial direction DRa. Furthermore, a direction, which is around the shaft central axis CL1, will be referred to as a first circumferential direction DRc1, and a direction, which is around the housing central axis CL2, will be referred to as a second circumferential direction DRc2. Furthermore, In the present embodiment, the various structures will be described while assuming as follows. That is, a direction, which is perpendicular to the axial direction DRa and radiates from the shaft central axis CL1, will be referred to as a first radial direction DRr1, and a direction, which is perpendicular to the axial direction DRa and radiates from the housing central axis CL2, will be referred to as a second radial direction DRr2. Details of a positional relationship between the shaft central axis CL1 and the housing central axis CL2 will be described later.

The main body 120 has: a bottom wall 121 which forms a bottom surface; and a peripheral wall 122 which surrounds the housing central axis CL2. The bottom wall 121 and the peripheral wall 122 cooperate with the main-body cover 124 to form a receiving space that receives the stationary disk 14 and the rotor 20 described later. The bottom wall 121 and the peripheral wall 122 are formed integrally in one-piece as an integral molded portion.

The housing central axis CL2 of the present embodiment is a central axis of the peripheral wall 122 which is shaped in a cylindrical tubular form and extends along the shaft central axis CL1 of the shaft 18. The housing central axis CL2 is equidistant from an outer periphery of a cylindrical tubular portion that forms the receiving space at the peripheral wall 122 (i.e., the housing central axis CL2 is at the same distance from all the points of the outer periphery of the cylindrical portion). Specifically, the housing central axis CL2 is equidistant from an outer periphery of a portion at the inside of the peripheral wall 122 while this portion is closer to the opening 120*a* than to the first outlet 12*b* and the second outlet 12*c* and excludes a portion that forms the inlet 12*a*.

The peripheral wall 122 is not provided at a position where the housing central axis CL2 is coaxial with the shaft central axis CL1. In other words, the peripheral wall 122 is eccentric with respect to the shaft central axis CL1.

The expression that the peripheral wall 122 is eccentric with respect to the shaft central axis CL1 means that a distance from the shaft central axis CL1 to each of an outer periphery and an inner periphery of the peripheral wall 122 is not constant in a cross-section of the peripheral wall 122 that is perpendicular to the axial direction DRa. In addition, as the peripheral wall 122 is eccentric with respect to the shaft central axis CL1, a center of the opening 120*a* of the peripheral wall 122, which is located on the one side in the axial direction DRa, is also eccentric with respect to the shaft central axis CL1.

The bottom wall 121 has two recesses respectively formed by a step at two portions of the bottom wall 121, which respectively correspond to a first passage hole 141 and a second passage hole 142 of the stationary disk 14 described later. In contrast, the recess is not formed at another portion of the bottom wall 121, which is opposed to a third passage hole 143 of the stationary disk 14. Specifically, a distance between the main-body cover 124 and each of the two portions of the bottom wall 121, which are respectively opposed to the first passage hole 141 and the second passage hole 142 of the stationary disk 14, is larger than a distance between the main-body cover 124 and the other portion of the bottom wall 121, which is opposed to the third passage hole 143 of the stationary disk 14.

The bottom wall 121 has: two stepped portions 121*a* each of which has the recess formed by the step and is opposed to the corresponding one of the first passage hole 141 and the second passage hole 142 of the stationary disk 14; and a non-stepped portion 121*b*, which does not have the recess and is opposed to the third passage hole 143 of the stationary disk 14. In the bottom wall 121, each of the stepped portions 121*a* is largely spaced from the stationary disk 14, and the non-stepped portion 121*b* is close to the stationary disk 14.

At the peripheral wall 122, the inlet 12*a* is formed at a location that is closer to the opening 120*a* than to the bottom wall 121, and the first outlet 12*b* and the second outlet 12*c* are formed at a location that is closer to the bottom wall 121 than to the opening 120*a*. The inlet 12*a*, the first outlet 12*b* and the second outlet 12*c* are respectively formed as a tubular member that has a flow passage at an inside thereof.

A mounting portion 122*a*, on which the stationary disk 14 is mounted, is formed at the inside of the peripheral wall 122 at a location that is between the portion of the peripheral wall 122, at which the inlet 12*a* is formed, and the other portion of the peripheral wall 122, at which the outlets 12*b*, 12*c* are formed. The peripheral wall 122 has: a first disk opposing portion 122*c* which is opposed to the stationary disk 14 in the second radial direction DRr2; and a second disk opposing portion 122*d* which is opposed to a drive disk 22 in the second radial direction DRr2.

Furthermore, at the inside of the peripheral wall 122, a seal installation portion 122*e*, at which a seal member 13 described later is installed, is formed at a location which is closer to the opening 120*a* than to the first disk opposing portion 122*c* and the second disk opposing portion 122*d*. Furthermore, as shown in FIG. 5, a receiving groove 125, which receives a rotation stop projection 145 of the stationary disk 14 described later, is formed at an inside of the first disk opposing portion 122*c* of the peripheral wall 122. A plurality of main-body attachment portions 122*m*, at which the main-body cover 124 is attached to the main body 120, and a plurality of installation portions 123, through which the valve device 10 is installed to the electric vehicle, are formed at the outside of the peripheral wall 122. Each of the installation portions 123 is a portion that is coupled to the electric vehicle at the time of installing the valve device 10 to the electric vehicle, and the installation portion 123 has a through-hole through which a coupling member for coupling with the electric vehicle is inserted.

The mounting portion 122*a* is a portion that contacts a back surface of the stationary disk 14 which is opposite to an opening surface 140 of the stationary disk 14. The mounting portion 122*a* is formed at a location at which an inner diameter changes at the peripheral wall 122. Specifically, the mounting portion 122*a* is a planar portion that extends in the second radial direction DRr2. The mounting portion 122*a* has a receiving groove 122*b* that receives a gasket 15 described later.

The first disk opposing portion 122*c* is formed such that an inner diameter Dh of the first disk opposing portion 122*c* without the receiving groove 125 is larger than an outer diameter Dd of the stationary disk 14 without the rotation stop projection 145. With this configuration, in a state where the stationary disk 14 is installed to the mounting portion 122*a*, a gap is formed between the stationary disk 14 and the peripheral wall 122.

Furthermore, an inner diameter of the first disk opposing portion 122*c* is smaller than an inner diameter of a portion of the peripheral wall 122, which forms the receiving space and is other than the first disk opposing portion 122*c*. That is, the inner diameter of the other portion of the peripheral wall 122, which forms the receiving space and is other than the first disk opposing portion 122*c*, is larger than the inner diameter of the first disk opposing portion 122*c*.

As shown in FIG. 5, the first disk opposing portion 122*c* has: a first opposing outer periphery 122*f* which forms an outer periphery of the first disk opposing portion 122*c*; and a first opposing inner periphery 122*g* which forms an inner periphery of the first disk opposing portion 122*c*. Furthermore, the first disk opposing portion 122*c* includes: a groove forming portion 122*h*, which forms the receiving groove 125; and a groove opposing portion 122*k*, which is opposed to the groove forming portion 122*h* in the second radial direction DRr2.

The first disk opposing portion 122*c* is formed such that a center (central axis) of the first opposing outer periphery 122*f* overlaps with the housing central axis CL2.

Furthermore, in the first disk opposing portion 122*c*, a portion of the first opposing inner periphery 122*g*, which forms the groove forming portion 122*h*, extends in the second circumferential direction DRc2. In the cross-section, which is shown in FIG. 5 and is perpendicular to the axial direction DRa, a center of an arc section of the groove forming portion 122*h*, which extends in the second circumferential direction DRc2, overlaps with the housing central axis CL2.

Specifically, at the cross-section of the first opposing inner periphery 122*g*, which is perpendicular to the axial direction DRa, a distance, which is measured from the housing central axis CL2 to the arc section of the groove forming portion 122*h*, is constant along the arc section of the groove forming portion 122*h*.

In contrast, the first disk opposing portion 122*c* is formed such that a center of another portion of the first opposing inner periphery 122*g*, which is other than the receiving groove 125, does not overlap with the housing central axis CL2. That is, in the cross-section, which is shown in FIG. 5 and is perpendicular to the axial direction DRa, the center of an arc section of the other portion of the first opposing inner periphery 122*g*, which does not form the receiving groove 125, does not overlap with the housing central axis CL2. In other words, at the cross-section, which is perpendicular to the axial direction DRa, a distance, which is measured from the housing central axis CL2 to the arc section of the first opposing inner periphery 122*g*, which is other than the receiving groove 125, is not constant along this arc section.

Furthermore, the other portion of the first opposing inner periphery 122*g*, which is other than the receiving groove 125, is eccentric with respect to the first opposing outer periphery 122*f*. Specifically, the other portion of the first opposing inner periphery 122*g*, which is other than the receiving groove 125, is eccentric with respect to the first opposing outer periphery 122*f* in an opposite direction that is opposite to the direction directed from the housing central axis CL2 to the groove forming portion 122*h*.

The amount of eccentricity between the other portion of the first opposing inner periphery 122*g*, which is other than the receiving groove 125, and the first opposing outer periphery 122*f* is preferably equal to or less than a groove depth (radial depth) of the receiving groove 125. In the present embodiment, the other portion of the first opposing inner periphery 122*g*, which is other than the receiving groove 125, is eccentric with respect to the housing central axis CL2 by the amount that is one half of the groove depth of the receiving groove 125.

Furthermore, a wall thickness of an adjacent portion of the first disk opposing portion 122*c*, which is adjacent to the groove forming portion 122*h*, is the largest in comparison to the wall thickness of another portion which is other than this adjacent portion. The wall thickness of the first disk opposing portion 122*c* is progressively decreased toward a side that is away from the groove forming portion 122*h* in the second circumferential direction DRc2.

That is, the wall thickness of the first disk opposing portion 122*c* is smallest at the farthest location that is farthest from the location where the receiving groove 125 is formed. In other words, in the first disk opposing portion 122*c*, the wall thickness of the groove opposing portion 122*k* is the smallest in comparison to the wall thickness of the other portion of the first disk opposing portion 122*c*.

It is desirable that at the first disk opposing portion 122*c*, a wall thickness difference, which is a difference between the wall thickness of the groove forming portion 122*h* and the wall thickness of the groove opposing portion 122*k*, is smaller than the groove depth of the receiving groove 125. Furthermore, this wall thickness difference is desirably equal to or smaller than one half of the groove depth of the receiving groove 125.

In the present embodiment, the first disk opposing portion 122*c* is formed such that the wall thickness difference becomes zero (0). That is, the first disk opposing portion 122*c* is formed such that the wall thickness of the groove forming portion 122*h* is substantially the same as the wall thickness of the groove opposing portion 122*k*.

The receiving groove 125 is formed by radially recessing the inside of the first disk opposing portion 122*c* away from the housing central axis CL2. The receiving groove 125 is formed such that the sufficient wall thickness of the groove forming portion 122*h* relative to the groove depth of the receiving groove 125 can be ensured. Specifically, the groove depth of the receiving groove 125 is equal to or smaller than one third of the wall thickness of the groove forming portion 122*h*. In the present embodiment, the receiving groove 125 is formed such that the size of the groove forming portion 122*h*, which is measured in a groove depth direction of the receiving groove 125 (i.e., a direction of the depth of the receiving groove 125), is equal to or smaller than one fifth of the wall thickness of the groove forming portion 122*h*.

Furthermore, the receiving groove 125 is formed at a location that is different from a location interposed between the housing central axis CL2L and the first outlet 12*b* in the second radial direction DRr2 and is also different from a location interposed between the housing central axis CL2 and the second outlet 12*c* in the second radial direction DRr2.

Here, a direction, which is directed from the housing central axis CL2 to the first outlet 12*b*, is defined as a first outlet direction DR1, and a direction, which is directed from the housing central axis CL2 to the second outlet 12*c*, is defined as a second outlet direction DR2. Furthermore, a direction, which is directed from the housing central axis CL2 to the groove forming portion 122*h*, is defined as a groove direction DR3.

The receiving groove 125 is placed at the location where the groove direction DR3 does not overlap with the first outlet direction DR1 and the second outlet direction DR2. In the present embodiment, the receiving groove 125 is placed at the location, at which the groove direction DR3 overlaps with a direction that is radially opposite to the first outlet direction DR1.

An inner diameter of the second disk opposing portion 122*d* is larger than an inner diameter of the first disk opposing portion 122*c*. Furthermore, the inner diameter of the second disk opposing portion 122*d* is larger than an outer diameter of the drive disk 22. With this configuration, a gap is formed between the drive disk 22 and the peripheral wall 122. Specifically, the drive disk 22 does not contact the peripheral wall 122 and is not positioned by the peripheral wall 122. The outer diameter of the drive disk 22 is substantially the same as the outer diameter Dd of the stationary disk 14.

The inside of the housing 12 is partitioned into an inlet-side space 12*d* and an outlet-side space 12*e* by the stationary disk 14 while the inlet-side space 12*d* and the outlet-side space 12*e* are communicated with the first passage hole 141. The inlet-side space 12*d* is a space communicated with the inlet 12*a* at the inside of the housing 12 and is also the receiving space which receives the stationary disk 14 and the rotor 20. The outlet-side space 12*e* is a space communicated with the first outlet 12*b* and the second outlet 12*c* at the inside of the housing 12.

Although not depicted in the drawing, the inside of the main body 120 is provided with a partition, which is shaped in a plate form and partitions between a first outlet-side space, which communicates the outlet-side space 12*e* to the first passage hole 141, and a second outlet-side space, which communicates the outlet-side space 12*e* to the second passage hole 142. This partition extends across the outlet-side space 12*e* in the second radial direction DRr2.

The seal installation portion 122*e* is formed by a planar portion which extends in the second radial direction DRr2 and is formed by increasing an inner diameter of the end portion of the peripheral wall 122, which is adjacent to the opening 120*a*, in comparison to the other portion of the peripheral wall 122. The seal installation portion 122*e* is a portion at which the seal member 13 for sealing a gap between the main body 120 and the main-body cover 124 is installed.

Each of the main-body attachment portions 122*m* is a portion, to which a fastening member TN for fastening the main body 120 and the main-body cover 124 together, is installed. Each of the main-body attachment portions 122*m* projects outward in the second radial direction DRr2 from an end portion of the peripheral wall 122, at which the opening 120*a* is formed. Although not depicted in the drawing, the number of the main-body attachment portions 122*m* is three, and these three main-body attachment portions 122*m* are arranged at predetermined intervals in the second circumferential direction DRc2. A plurality of main body insertion holes 122*n*, into each of which a corresponding one of the fastening members TN is inserted, extend in the axial direction DRa at the main-body attachment portions 122*m*, respectively, on the radially outer side of the peripheral wall 122 in the second radial direction DRr2.

The main-body cover 124 is a lid member that covers the opening 120*a* of the main body 120. The main-body cover 124 has a plate portion 124*a*, a cover rib portion 124*b*, a boss portion 124*c*, a cover peripheral wall 124*d* and a plurality of cover attachment portions 124*e*. The plate portion 124*a*, the cover rib portion 124*b*, the boss portion 124*c*, the cover peripheral wall 124*d* and the cover attachment portions 124*e* are formed integrally in one-piece as an integral molded portion.

The plate portion 124*a* is shaped in a circular ring form that extends in the second radial direction DRr2. In the main-body cover 124, the plate portion 124*a* forms the inlet-side space 12*d* in corporation with the peripheral wall 122 and the stationary disk 14.

Furthermore, an outer diameter of the plate portion 124*a* is increased stepwise from the other side toward the one side in the axial direction DRa. Specifically, the plate portion 124*a* has: a seal support portion 124*f*, which is located on the other side in the axial direction DRa; and a lid portion 124*g*, which is connected to the seal support portion 124*f*. In the plate portion 124*a*, an outer diameter of the lid portion 124*g* is larger than an outer of the seal support portion 124*f*.

The seal support portion 124*f* is a portion for clamping the seal member 13 installed at the seal installation portion 122*e*. The outer diameter of the seal support portion 124*f* is slightly smaller than an inner diameter of the opening 120*a*. Therefore, a gap is formed between an inner periphery of the opening 120*a* and an outer periphery of the seal support portion 124*f*. In the present embodiment, the seal support portion 124*f* serves as an opening closure portion.

The seal support portion 124*f* clamps the seal member 13 between a surface of the seal support portion 124*f*, which is located on the other side in the axial direction DRa, and the seal installation portion 122*e* when the seal support portion 124*f* is inserted from the opening 120*a* into the inlet-side space 12*d*. Therefore, the gap between the inner periphery of the opening 120*a* and the outer periphery of the seal support portion 124*f* is sealed by the seal member 13.

The seal support portion 124*f* is formed such that an outer circumference of the seal support portion 124*f*, which defines an outer periphery of the seal support portion 124*f*, has a center (central axis) that overlaps with the housing central axis CL2. That is, in a cross-section, which is perpendicular to the axial direction DRa, a distance from the housing central axis CL2 to the outer periphery of the seal support portion 124*f* is equidistant (i.e., the housing central axis CL2 is at the same distance from all the points of the outer periphery of the seal support portion 124*f*). Furthermore, the seal support portion 124*f* is eccentric with respect to the shaft central axis CL1. Hereinafter, the center of the outer circumference, which defines the outer periphery of the seal support portion 124*f*, will be also referred to as a support portion center.

The lid portion 124*g* is a portion that closes the opening 120*a* at the time of fastening the main body 120 and the main-body cover 124 together. The lid portion 124*g* is located on the outer side of the seal support portion 124*f* in the second radial direction DRr2. The outer diameter of the lid portion 124*g* is larger than an inner diameter of the opening 120*a* of the main body 120, so that the lid portion 124*g* cannot be inserted into the opening 120*a*. Furthermore, the outer diameter of the lid portion 124*g* is substantially the same as an outer diameter of the peripheral wall 122.

The seal member 13 is made of urethane rubber, which is an elastomer, and the seal member 13 is resiliently deformable in the axial direction DRa when the seal member 13 is clamped between the seal support portion 124*f* and the seal installation portion 122*e*. The seal member 13 is a member shaped in a circular ring form, a thickness direction of which coincides with the axial direction DRa. In the present embodiment, an O-ring is used as the seal member 13.

An outer diameter of the seal member 13 is slightly smaller than an inner diameter of the opening 120*a*, and an inner diameter of the seal member 13 is slightly larger than an outer diameter of the cover rib portion 124*b*. In other words, the seal member 13 has: the outer diameter which is slightly smaller than the inner diameter of the opening 120*a* of the main body 120; and the inner diameter which is slightly larger than the outer diameter of the cover rib portion 124*b*. The seal member 13 contacts the inner periphery of the opening 120*a* and the outer periphery of the cover rib portion 124*b* and seals between the inlet-side space 12*d* and the valve device 10. The seal member 13 is indicated with shaded hatching in FIG. 4 to indicate the installation location of the seal member 13.

The seal member 13 is placed at a location where a center of an outer periphery of the seal member 13, which defines an outer periphery of the seal member 13, and a center of an inner periphery of the seal member 13, which defines an inner periphery of the seal member 13, overlaps with the housing central axis CL2. Specifically, the seal member 13 is formed such that a distance from the housing central axis CL2 to the outer periphery of the seal member 13 is equidistant, and a distance from the housing central axis CL2 to the inner periphery of the seal member 13 is equidistant. In other words, the seal member 13 is arranged such that a center of a cross-section of the seal member 13, which is perpendicular to the axial direction DRa, and a center of a cross-section of the peripheral wall 122, which is perpendicular to the axial direction DRa, are positioned along a straight line. Hereinafter, the center of the cross-section of the seal member 13, which is perpendicular to the axial direction DRa, will be also referred to as a seal member center.

The seal member 13 is not placed at a position where the seal member center overlaps with the shaft central axis CL1. In other words, the seal member 13 is eccentric with respect to the shaft central axis CL1. Since the peripheral wall 122 is eccentric with respect to the shaft central axis CL1 by the predetermined amount of eccentricity d, the seal member 13 is also eccentric with respect to the shaft central axis CL1 by the predetermined amount of eccentricity d in the same direction as that of the peripheral wall 122. The amount of eccentricity d will be described later.

The cover rib portion 124*b* is a portion of the main-body cover 124 which is inserted into the opening 120*a* of the main body 120. The cover rib portion 124*b* is shaped in a tubular form and is located on the radially outer side of the plate portion 124*a*. The cover rib portion 124*b* projects from the plate portion 124*a* toward the bottom wall 121.

The boss portion 124*c* is a portion through which the shaft 18 is inserted at the inside thereof. The boss portion 124*c* is shaped in a tubular form and is located on the radially inner side of the plate portion 124*a*. The boss portion 124*c* projects from the plate portion 124*a* toward the one side in the axial direction DRa. A shaft seal 124*h* is provided to the boss portion 124*c*, and an O-ring 124*k*, which seals a gap between the boss portion 124*c* and the drive device 16, is installed at the outside of the boss portion 124*c*. The shaft seal 124*h* is a seal member which is shaped in a ring form and seals a gap between the boss portion 124*c* and the shaft 18. Furthermore, a bearing 124*m*, which rotatably supports the shaft 18, is installed at the inside of the boss portion 124*c*.

The drive device 16 is inserted at an inside of the cover peripheral wall 124*d*. The cover peripheral wall 124*d* is shaped in a tubular form and is located on the radially outer side of the boss portion 124*c*. The drive device 16 is inserted between an outer periphery of the boss portion 124*c* and an inner periphery of the cover peripheral wall 124*d*.

Each of the cover attachment portions 124*e* is a portion which corresponds to the main-body attachment portion 122*m* and receives the corresponding fastening member TN for fastening the main body 120 and the main-body cover 124 together. Each of the cover attachment portions 124*e* projects outward from an outer periphery of the cover peripheral wall 124*d* in the second radial direction DRr2. Although not depicted in the drawing, the number of the cover attachment portions 124*e* is three, and these three cover attachment portions 124*e* are located on the radially outer side of the cover peripheral wall 124*d* and are arranged at predetermined intervals in the second circumferential direction DRc2. Each of the cover attachment portions 124*e* is placed at a location that corresponds to a corresponding one of the main-body attachment portions 122*m*.

A cover insertion hole 124*n*, into which the corresponding fastening member TN is inserted, extends in the axial direction DRa at each of the cover attachment portions 124*e* at a location that is on the radially outer side of the peripheral wall 122 in the second radial direction DRr2. The cover insertion hole 124*n* is placed at a location that corresponds to a location of the main body insertion hole 122*n*.

The stationary disk 14 is a circular disk member, a thickness direction of which coincides with the axial direction DRa. The stationary disk 14 has the opening surface 140 that is a front surface of the stationary disk 14 along which the drive disk 22 slides. The opening surface 140 is a contact surface that contacts a sliding surface 220 of the drive disk 22.

Preferably, the stationary disk 14 is made of a material that has a smaller coefficient of linear expansion and superior wear resistance in comparison to the material of the housing 12. The stationary disk 14 is made of a high-hardness material that has a hardness higher than that of the housing 12. Specifically, the stationary disk 14 is made of ceramic. The stationary disk 14 is a powder molded product that is formed by molding ceramic powder into a desired shape with a press machine. Only a portion of the stationary disk 14, which forms the opening surface 140, may be made of the material, such as the ceramic, which has the smaller coefficient of linear expansion and the superior wear resistance in comparison to the material of the housing 12.

Furthermore, as shown in FIG. 5, the stationary disk 14 is a passage forming portion that forms the first passage hole 141 and the second passage hole 142 which conduct the fluid therethrough. Therefore, in the valve device 10 of the present embodiment, the stationary disk 14, which is the passage forming portion, is formed as a separate member that is formed separately relative to the housing 12.

Furthermore, the third passage hole 143, which does not conduct the fluid, is formed at the stationary disk 14. Furthermore, the stationary disk 14 has: a stationary outer periphery 144 which is opposed to the peripheral wall 122; and the rotation stop projection 145 which projects toward the peripheral wall 122.

Each of the passage holes 141, 142, 143 is formed at a corresponding location of the stationary disk 14 which is spaced from the shaft central axis CL1 of the shaft 18, so that each of the passage holes 141, 142, 143 does not overlap with the shaft central axis CL1 of the shaft 18. Each of the passage holes 141, 142, 143 is a through-hole that is shaped in a form of a sector. Each of the first passage hole 141 and the second passage hole 142 serve as a communication passage that communicates between the inlet-side space 12*d* and the outlet-side space 12*e*. In contrast, the other side of the third passage hole 143, which is located on the other side in the axial direction DRa, is closed by the non-stepped portion 121*b*, so that the third passage hole 143 does not function as a communication passage that communicates between the inlet-side space 12*d* and the outlet-side space 12*e*. The shape of each of the passage holes 141, 142, 143 may be in another form, such as a form of circle, a form of ellipse instead of the form of sector.

Specifically, the first passage hole 141 is formed at a corresponding location of the stationary disk 14, which corresponds to the first outlet-side space, to enable communication of the first passage hole 141 with the first outlet-side space. Specifically, the second passage hole 142 is formed at a corresponding location of the stationary disk 14, which corresponds to the second outlet-side space, to enable communication of the second passage hole 142 with the second outlet-side space. The third passage hole 143 is placed at a location that corresponds to the non-stepped portion 121*b*, so that the third passage hole 143 is not communicated with the first outlet-side space and the second outlet-side space.

A stationary disk hole 146 is formed at generally a center part of the stationary disk 14. The stationary disk hole 146 is a stationary-side through-hole, through which the shaft 18 is inserted. An inner diameter of the stationary disk hole 146 is larger than the diameter of the shaft 18, so that the shaft 18 does not slide relative to the stationary disk hole 146.

The stationary outer periphery 144 forms an outer contour of the stationary disk 14. A portion of the stationary outer periphery 144, which forms the rotation stop projection 145, is opposed to the receiving groove 125.

The rotation stop projection 145 is a rotation limiting portion that is fitted into the receiving groove 125 to limit rotation of the stationary disk 14 in the first circumferential direction DRc1. The rotation stop projection 145 is formed at a location that corresponds to the receiving groove 125 in the first radial direction DRr1 at the time of placing the stationary disk 14 at the inside of the main body 120. The rotation stop projection 145 is formed such that the portion of the stationary outer periphery 144, which forms the rotation stop projection 145, projects further toward the radially outer side in the first radial direction DRr1 in comparison to another portion of the stationary outer periphery 144, which does not form the rotation stop projection 145, and thereby the portion of the stationary outer periphery 144, which forms the rotation stop projection 145, projects away from the shaft central axis CL1.

The rotation stop projection 145 is sized to enable fitting of the rotation stop projection 145 into the receiving groove 125. Specifically, a size of the rotation stop projection 145, which is measured in a direction that is perpendicular to the axial direction DRa and the groove direction DR3, is slightly smaller than a size of the receiving groove 125, which is measured in the direction that is perpendicular to the axial direction DRa and the groove direction DR3. Movement of the stationary disk 14 in the first circumferential direction DRc1 is limited by fitting the rotation stop projection 145 into the receiving groove 125.

The stationary disk 14 is placed at a location where the center (central axis) of the stationary outer periphery 144 except the rotation stop projection 145 overlaps with the shaft central axis CL1. That is, in the stationary disk 14, a distance, which is measured from the shaft central axis CL1 to the stationary outer periphery 144 except the rotation stop projection 145, is equidistant. In other words, the stationary disk 14 is coaxial with respect to the shaft 18.

The stationary disk 14 is not placed at the location where the center of the stationary outer periphery 144 except the rotation stop projection 145 overlaps with the housing central axis CL2. In other words, the stationary disk 14 is eccentric with respect to the housing central axis CL2. Since the shaft central axis CL1 is eccentrically displaced relative to the housing central axis CL2 by the predetermined amount of eccentricity d, the stationary disk 14 is eccentric with respect to the housing central axis CL2 by the predetermined amount of eccentricity d. Hereinafter, the center of the stationary outer periphery 144 of the stationary disk 14 except the rotation stop projection 145 will be also referred to as a stationary disk center.

The gasket 15, which seals a gap between the stationary disk 14 and the mounting portion 122*a*, is placed between the stationary disk 14 and the mounting portion 122*a*. The gasket 15 is made of rubber. The gasket 15 is received in the receiving groove 122*b* formed at the mounting portion 122*a*. The gasket 15 has at least two projections at a seal surface opposed to the stationary disk 14 and at least two projections at another seal surface opposed to the mounting portion 122*a*. Specifically, the gasket 15 has two projections that project in the axial direction DRa. Such a gasket 15 can be obtained by a simple method, for example, by forming recesses at a flat seal surface.

The drive device 16 is a device for outputting the rotational force. Although not depicted in the drawings, the drive device 16 includes: an electric motor which serves as a drive power source; and a gear arrangement which serves as a drive force transmission member and transmits the output of the electric motor to the shaft 18. For example, a servomotor or a brushless motor is used as the electric motor. The gear arrangement is formed by a gear mechanism that includes, for example, a helical gear or a spur gear. Although not depicted in the drawings, the electric motor is rotated according to a control signal outputted from a valve controller unit that is electrically connected to the electric motor. The valve controller unit is a computer that includes a memory (a non-transitory tangible storage medium) and a processor. The valve controller unit executes a computer program stored in the memory and also executes various control processes according to the computer program.

The shaft 18 is a rotatable column that is rotated about the predetermined shaft central axis CL1 by the rotational force outputted from the drive device 16. The shaft 18 extends in the axial direction DRa. Two axial sides of the shaft 18, which are opposite to each other in the axial direction DRa, are rotatably supported by the housing 12. Specifically, the shaft 18 has a both-ends supported structure. The shaft 18 extends through the stationary disk 14 and the drive disk 22 and is rotatably supported related to the housing 12.

Specifically, one axial side of the shaft 18, which is located on the one side in the axial direction DRa, is rotatably supported by the bearing 124*m*, which is installed at the inside of the main-body cover 124. Furthermore, the other axial side of the shaft 18, which is located on the other side in the axial direction DRa, is supported by a bearing hole 121*c* formed at the bottom wall 121 of the main body 120. The bearing hole 121*c* is formed by a plain bearing. The bearing hole 121*c* may be formed by a ball bearing or the like instead of the plain bearing.

The shaft 18 includes: a shaft core 181 which is made of metal; and a holder 182 which is made of resin and is coupled to the shaft core 181. The shaft core 181 is coupled to the holder 182 such that the shaft core 181 is rotatable integrally with the holder 182. The shaft core 181 and the holder 182 are formed as an insert molded product that is formed integrally by insert molding.

The shaft core 181 includes the shaft central axis CL1 of the shaft 18 and extends in the axial direction DRa. The shaft core 181 is a portion that becomes a center of rotation of the rotor 20. The shaft core 181 is formed by a rod member made of metal to ensure a required degree of straightness of the shaft core 181.

The holder 182 is coupled to the one side of the shaft core 181, which is located on the one side in the axial direction DRa. The holder 182 is shaped in a bottomed tubular form. The shaft core 181 is coupled to an inside of a distal end part of the holder 182 which is located on the one side in the axial direction DRa. Furthermore, the distal end part of the holder 182, which projects to the outside of the housing 12, is coupled to the gear arrangement of the drive device 16.

The rotor 20 is rotated by the output of the drive device 16 about the central axis CL1 of the shaft 18. The rotor 20 increases or decreases an opening degree of each of the passage holes 141, 142 of the stationary disk 14 in response to the rotation of the shaft 18. As shown in FIG. 4, the rotor 20 includes: the drive disk 22, which serves as a valve element; and a lever 24, which couples the drive disk 22 to the shaft 18.

The drive disk 22 is the valve element which increases or decreases an opening degree of the first passage hole 141 and an opening degree of the second passage hole 142 in response to the rotation of the shaft 18. The opening degree of the first passage hole 141 is a degree of opening of the first passage hole 141. Here, the opening degree of the first passage hole 141 in a full-opening state thereof is indicated as 100%, and the opening degree of the first passage hole 141 in a full-closing state thereof is indicated as 0%. The full-opening state of the first passage hole 141 is a state where the first passage hole 141 is not closed by the drive disk 22 at all. The full-closing state of the first passage hole 141 is a state where a whole of the first passage hole 141 is closed by the drive disk 22. The opening degree of the second passage hole 142 is the same as the opening degree of the first passage hole 141.

The drive disk 22 is a circular disk member, a thickness direction of which coincides with the axial direction DRa. The drive disk 22 is placed in the inlet-side space 12*d* such that the drive disk 22 is opposed to the stationary disk 14 in the axial direction DRa. The drive disk 22 has the sliding surface 220 that is opposed to the opening surface 140 of the stationary disk 14. The sliding surface 220 is a seal surface that seals the opening surface 140 of the stationary disk 14.

Preferably, the drive disk 22 is made of a material that has a smaller coefficient of linear expansion and superior wear resistance in comparison to the material of the housing 12. The drive disk 22 is made of a high-hardness material that has a hardness higher than that of the housing 12. Specifically, the drive disk 22 is made of ceramic. The drive disk 22 is a powder molded product that is formed by molding ceramic powder into a desired shape with a press machine. Only a portion of the drive disk 22, which forms the sliding surface 220, may be made of the material, such as the ceramic, which has the smaller coefficient of linear expansion and the superior wear resistance in comparison to the material of the housing 12.

Here, the ceramic is a material that has a small coefficient of linear expansion and shows little dimensional change upon absorption of water and has excellent wear resistance. when the drive disk 22 is made of the ceramic, the positional relationship between the drive disk 22 and the shaft 18, and the positional relationship between the drive disk 22 and the housing 12 are stabilized. As a result, a required accuracy of the flow rate control can be ensured, and unintended fluid leakage can be limited.

Furthermore, the drive disk 22 has a rotor hole 221 that is placed at a location which is eccentric with respect to the shaft central axis CL1 of the shaft 18. The rotor hole 221 is a through-hole that extends through the drive disk 22 in the axial direction DRa. The rotor hole 221 is formed at the location which overlaps with the first passage hole 141 and the second passage hole 142 in the axial direction DRa when the drive disk 22 is rotated about the shaft central axis CL1 of the shaft 18.

Therefore, like the stationary disk 14, the drive disk 22 is eccentric with respect to the housing central axis CL2 by the predetermined amount of eccentricity d. Specifically, the drive disk 22 is placed at a position where a center (central axis) of an outer circumference, which defines an outer periphery of the drive disk 22, overlaps with the shaft central axis CL1. That is, the drive disk 22 is placed at the position where the drive disk 22 is coaxial with the stationary disk 14 and the shaft 18. Hereinafter, the center of the outer circumference, which defines the outer periphery of the drive disk 22, will be also referred to as a drive disk center.

The drive disk 22 has a shaft insertion hole 223 at a substantially center of the drive disk 22. The shaft insertion hole 223 is a drive-side insertion hole through which the shaft 18 is inserted. An inner diameter of the shaft insertion hole 223 is larger than a diameter of the shaft 18, so that the shaft 18 does not slide relative to the shaft insertion hole 223.

In the valve device 10, when the drive disk 22 is rotated to a position, at which the rotor hole 221 overlaps with the first passage hole 141 in the axial direction DRa, the first passage hole 141 is opened. Also, in the valve device 10, when the drive disk 22 is rotated to a position, at which the rotor hole 221 overlaps with the second passage hole 142 in the axial direction DRa, the second passage hole 142 is opened.

The drive disk 22 is configured to adjust a flow rate ratio between the fluid, which passes through the first passage hole 141, and the fluid, which passes through the second passage hole 142. That is, the drive disk 22 is configured such that when the opening degree of the first passage hole 141 is increased, the opening degree of the second passage hole 142 is decreased.

The lever 24 is a coupling member that couples between the shaft 18 and the drive disk 22. The lever 24 is fixed to the drive disk 22 and couples between the drive disk 22 and the shaft 18 such that the drive disk 22 and the shaft 18 are integrally rotatable in a state where the drive disk 22 is displaceable in the axial direction DRa.

The compression spring 26 is an urging member that urges the rotor 20 to the stationary disk 14. The compression spring 26 is resiliently deformed in the axial direction DRa of the shaft 18. The compression spring 26 is placed at the inside of the housing 12 in a state where the compression spring 26 is compressed in the axial direction DRa such that one end part of the compression spring 26, which is located on the one side in the axial direction DRa, contacts the shaft 18, and the other end part of the compression spring 26, which is located on the other side in the axial direction DRa, contacts the rotor 20. Specifically, the compression spring 26 is placed such that the one end part of the compression spring 26, which is located on the one side in the axial direction DRa, contacts an inside of the holder 182, and the other end part of the compression spring 26, which is located on the other side in the axial direction DRa, contacts the lever 24. The compression spring 26 is not fixed to at least one of the rotor 20 and the shaft 18, so that the compression spring 26 does not function as a torsion spring.

The rotor 20 is urged against the stationary disk 14 by the compression spring 26, so that a contact state, in which the opening surface 140 of the stationary disk 14 and the sliding surface 220 of the drive disk 22 contact with each other, is maintained. This contact state is a state where the opening surface 140 of the stationary disk 14 and the sliding surface 220 of the drive disk 22 make surface-to-surface contact with each other. That is, the valve device 10 can maintain the orientation of the drive disk 22 such that the drive disk 22 is kept in contact with the stationary disk 14.

Specifically, the compression spring 26 is arranged to surround the shaft central axis CL1 of the shaft 18. In other words, the shaft 18 is placed at an inside of the compression spring 26. With this configuration, it is possible to limit uneven distribution of the load of the compression spring 26 against the drive disk 22 in the first circumferential direction DRc1 of the shaft 18, and thereby the contact state of the sliding surface 220 relative to the opening surface 140 can be easily maintained.

The first torsion spring 28 is a spring that urges the shaft 18 against the housing 12 in the first circumferential direction DRc1 around the shaft central axis CL1 of the shaft 18. The first torsion spring 28 is placed between the housing 12 and the shaft 18.

Basically, the first torsion spring 28 is used in a state where the first torsion spring 28 is twisted in the first circumferential direction DRc1 and is thereby resiliently deformed. An urging force of the first torsion spring 28 is applied to the shaft 18 in both a rotating state, in which the shaft 18 is rotated, and a stop state, in which the shaft 18 is not rotated. The urging force of the first torsion spring 28 is transmitted as a rotational force from the gear arrangement of the drive device 16 to the electric motor through the shaft 18. Therefore, by placing the first torsion spring 28 between the housing 12 and the shaft 18, rattling in the first circumferential direction DRc1 between the drive device 16 and the shaft 18 is limited. The first torsion spring 28 is merely twisted in the first circumferential direction DRc1 and is not compressed in the axial direction DRa.

The second torsion spring 30 is a spring that urges the lever 24 against the shaft 18 in the first circumferential direction DRc1. The second torsion spring 30 is placed between the shaft 18 and the lever 24. An axial dimension of the second torsion spring 30 measured in the axial direction DRa is smaller than that of the first torsion spring 28, and a radial dimension of the second torsion spring 30 measured in the first radial direction DRr1 is smaller than that of the first torsion spring 28.

Basically, the second torsion spring 30 is used in a state where the second torsion spring 30 is twisted in the first circumferential direction DRc1 and is thereby resiliently deformed. An urging force of the second torsion spring 30 is applied to the lever 24 in both a rotating state, in which the shaft 18 is rotated, and a stop state, in which the shaft 18 is not rotated. The urging force of the second torsion spring 30 is transmitted to the drive disk 22 as a rotational force through the lever 24. Therefore, by placing the second torsion spring 30 between the shaft 18 and the lever 24, rattling in the first circumferential direction DRc1 between the shaft 18 and the lever 24 is limited. Furthermore, since the lever 24 is fixed to the drive disk 22, rattling in the first circumferential direction DRc1 between the shaft 18 and the drive disk 22 is limited by the second torsion spring 30. The second torsion spring 30 is merely twisted in the first circumferential direction DRc1 and is not compressed in the axial direction DRa.

In the valve device 10, the shaft 18, the lever 24 and the shaft 18 are assembled as a sub-assembly by engaging the shaft 18 to the lever 24 in a state where the second torsion spring 30 is interposed between the shaft 18 and the lever 24.

Next, an operation of the valve device 10 of the present embodiment will be described. As shown in FIGS. 1 to 4, in the valve device 10, the fluid flows from the inlet 12*a* into the inlet-side space 12*d*, as indicated by an arrow Fi. Then, in a case where the first passage hole 141 is opened, the fluid flows from the inlet-side space 12*d* to the first outlet-side space through the first passage hole 141. The fluid, which flows into the first outlet-side space, flows from the first outlet-side space to the outside of the valve device 10 through the first outlet 12*b*, as indicated by an arrow Flo. In this case, the flow rate of the fluid, which passes through the first passage hole 141, is determined according to the opening degree of the first passage hole 141. That is, the flow rate of the fluid, which flows from the inlet 12*a* to the first outlet 12*b* through the first passage hole 141, is increased when the opening degree of the first passage hole 141 is increased.

In contrast, in another case where the second passage hole 142 is opened, the fluid flows from the inlet-side space 12*d* to the second outlet-side space through the second passage hole 142. The fluid, which flows into the second outlet-side space, flows from the second outlet-side space to the outside of the valve device 10 through the second outlet 12*c*, as indicated by an arrow F2*o*. In this case, the flow rate of the fluid, which passes through the second passage hole 142, is determined according to the opening degree of the second passage hole 142. That is, the flow rate of the fluid, which flows from the inlet 12*a* to the second outlet 12*c* through the second passage hole 142, is increased when the opening degree of the second passage hole 142 is increased.

Next, the eccentricity between the shaft central axis CL1 and the housing central axis CL2 will be described. As described above, in the valve device 10 of the present embodiment, the shaft central axis CL1 is eccentric with respect to the housing central axis CL2. Furthermore, the center of the outer circumference of the portion, which forms the receiving space at the peripheral wall 122, the seal support portion center and the seal member center overlap the housing central axis CL2.

In contrast, the stationary disk center and the drive disk center are eccentric with respect to the housing central axis CL2 and overlap with the shaft central axis CL1 that is the central axis of the shaft 18.

Now, there is assumed an imaginary case where the shaft central axis CL1 and the housing central axis CL2 are not eccentric to each other, and the center of the outer circumference of the peripheral wall 122, the center of the outer circumference of the seal support portion 124*f*, the center of the outer circumference of the seal member 13, the center of the outer circumference of the stationary disk 14 and the center of the outer circumference of the drive disk 22 overlap with the shaft central axis CL1.

In this case, the receiving groove 125, in which the rotation stop projection 145 is fitted, may be formed at the inner periphery of the peripheral wall 122 by extending the receiving groove 125 from the end portion of the peripheral wall 122, at which the opening 120*a* is formed, to the first disk opposing portion 122*c* in the axial direction DRa. By forming the receiving groove 125 in this manner, the stationary disk 14 can be inserted from the opening 120*a* into the inlet-side space 12*d* in the state where the rotation stop projection 145 is fitted into the receiving groove 125.

However, in the case where the receiving groove 125 is formed in the above-described manner, the receiving groove 125 is also formed at the location of the opening 120*a*. Therefore, a gap is formed between the seal member 13 and the receiving groove 125, and the fluid may possibly leak from this gap to the outside of the valve device 10.

In contrast, according to the present embodiment, the receiving groove 125 is formed at the first opposing inner periphery 122*g* that is formed by increasing the inner diameter of the other portion of the peripheral wall 122, which is other than the first disk opposing portion 122*c*, by the amount that corresponds to the radial size of the rotation stop projection 145, so that the first opposing inner periphery 122*g* projects radially inward in the second radial direction DRr2 in comparison to the other portion of the peripheral wall 122. In this way, at the time of inserting the stationary disk 14 from the opening 120*a* into the inlet-side space 12*d*, the rotation stop projection 145 does not interfere with the inner periphery of the peripheral wall 122.

Here, in the case where the inner diameter of the other portion of the peripheral wall 122, which is other than the first disk opposing portion 122*c*, is increased, it is necessary to ensure the sufficient size of the peripheral wall 122 in the second radial direction DRr2, i.e., the sufficient wall thickness of the peripheral wall 122 from the viewpoint of ensuring the strength of the valve device 10. For this reason, it is not desirable that the wall thickness of the peripheral wall 122 is reduced by increasing the inner diameter of the peripheral wall 122.

In addition, there is another method of ensuring the sufficient wall thickness of the peripheral wall 122 by increasing the outer diameter of the peripheral wall 122 by the amount, which corresponds to the radial size of the rotation stop projection 145, as indicated by a dot-dash line in FIG. 5 in response to the increase in the inner diameter of the peripheral wall 122. However, this method results in the increase in the outer diameter of the peripheral wall 122 by the amount, which corresponds to the radial size of the rotation stop projection 145, so that an overall size of the valve device 10 is disadvantageously increased. Therefore, this method is not desirable.

In view of the above-described disadvantages, in the valve device 10 of the present embodiment, the shaft central axis CL1 is eccentrically displaced relative to the housing central axis CL2. Specifically, the shaft central axis CL1 is eccentrically displaced relative to the housing central axis CL2 by the predetermined amount of eccentricity d in the opposite direction that is opposite to the groove direction DR3.

In this way, the seal support portion 124*f* is eccentric with respect to the shaft central axis CL1 such that the distance between the support portion center and the housing central axis CL2 is set to be smaller than the predetermined amount of eccentricity d. Specifically, the seal support portion 124*f* is eccentric with respect to the shaft central axis CL1 by the predetermined amount of eccentricity d in the groove direction DR3. In this way, the seal support portion 124*f* is formed such that the support portion center overlaps with the housing central axis CL2.

Furthermore, the seal member 13 is eccentric with respect to the shaft central axis CL1 such that the distance between the seal member center and the housing central axis CL2 is set to be smaller than the predetermined amount of eccentricity d. Specifically, the seal member 13 is eccentric with respect to the shaft central axis CL1 in the groove direction DR3 by the predetermined amount of eccentricity d. In this way, the seal member 13 is formed such that the seal member center overlaps with the housing central axis CL2.

The predetermined amount of eccentricity d is set such that the sufficient wall thickness of each of the groove forming portion 122*h* and the groove opposing portion 122*k* is ensured when the receiving groove 125, into which the rotation stop projection 145 is fitted, is formed at the groove forming portion 122*h*. In other words, the predetermined amount of eccentricity d is set such that the wall thickness of the groove forming portion 122*h* is equal to or larger than a portion of the first disk opposing portion 122*c* which has the smallest wall thickness at the first disk opposing portion 122*c*. In the present embodiment, the predetermined amount of eccentricity d is set such that the wall thickness of the groove forming portion 122*h* is substantially equal to the wall thickness of the groove opposing portion 122*k* which has the smallest wall thickness at the first disk opposing portion 122*c*.

Furthermore, the predetermined amount of eccentricity d is set to a value that is smaller than the size of the rotation stop projection 145 measured in the groove direction DR3 and the size of the receiving groove 125 measured in the groove direction DR3. In the present embodiment, the predetermined amount of eccentricity d is set to a value that is equal to or smaller than one half of the size of the rotation stop projection 145 measured in the groove direction DR3. Also, the predetermined amount of eccentricity d is set to a value that is equal to or smaller than one third of the size of the receiving groove 125 measured in the groove direction DR3.

According to the above configuration, by eccentrically displacing the housing central axis CL2 relative to the shaft central axis CL1, it is possible to limit an increase in the overall size of the valve device 10 caused by the formation of the receiving groove 125 while ensuring the sufficient wall thickness of the groove forming portion 122*h*, at which the receiving groove 125 is formed.

Furthermore, since the housing central axis CL2 is eccentrically displaced relative to the shaft central axis CL1 by the predetermined amount of eccentricity d, the seal support portion 124*f* and the seal member 13 are also eccentric with respect to the shaft central axis CL1 by the predetermined amount of eccentricity d. Therefore, in comparison to the case where the seal member 13 is not eccentric with respect to the shaft central axis CL1, enlargement of the seal member 13 is limited while limiting the leakage of the fluid from the gap between the outer periphery of the seal support portion 124*f* and the inner periphery of the opening 120*a*.

Other Embodiments

Although the representative embodiment of the present disclosure has been described above, the present disclosure is not limited to the above-described embodiment and can be variously modified, for example, as follows.

Figure 6:
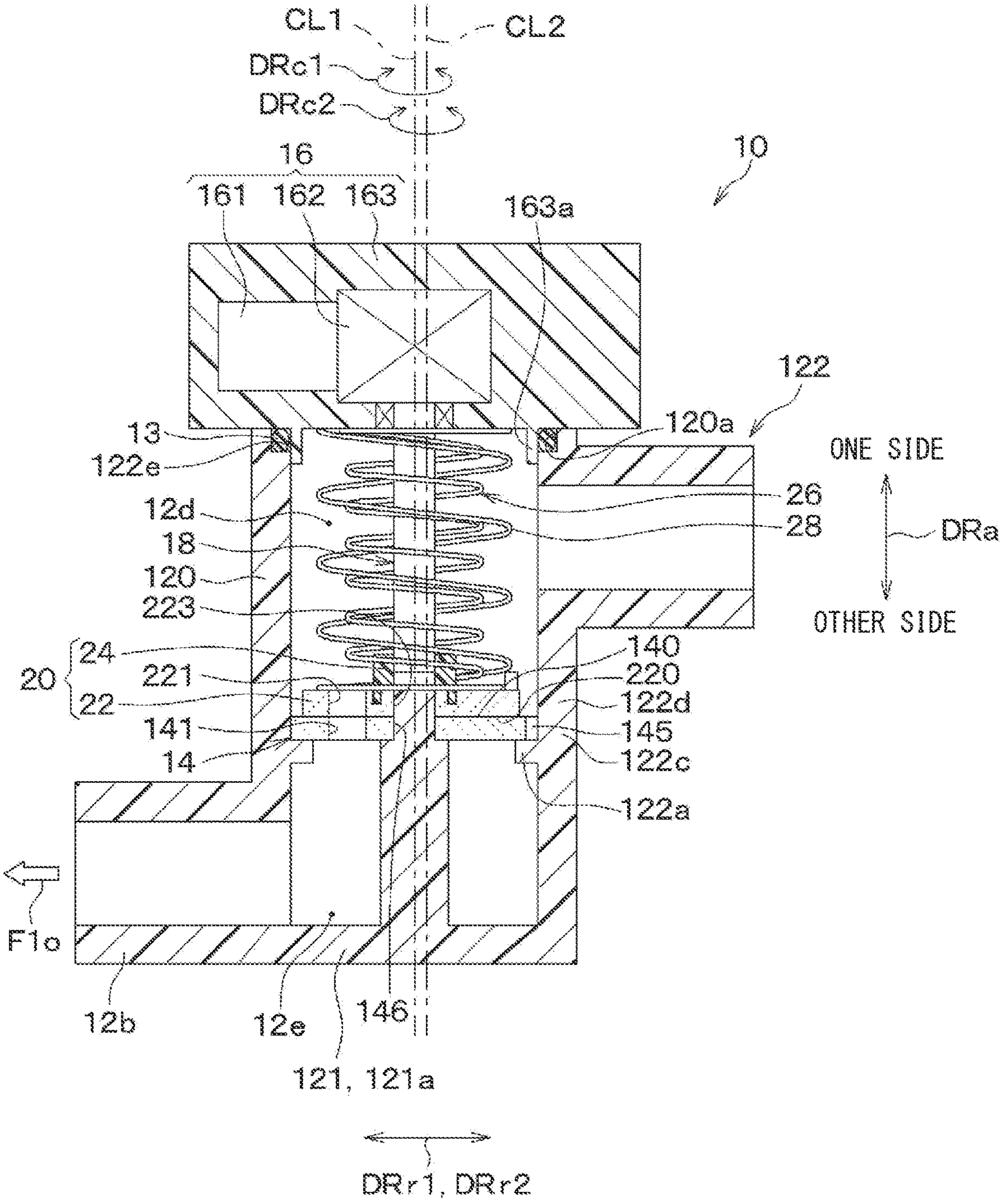
FIG. 6 is a cross-sectional view of a valve device of another embodiment.

In the embodiment described above, there is described the example where the opening 120*a* is closed by the main-body cover 124. However, the present disclosure is not limited to this configuration. For example, as shown in FIG. 6, the opening 120*a* may be closed by the drive device 16. It should be noted that FIG. 6 is a simplified diagram that is simplified in comparison to FIG. 4 described in the above embodiment, and some constituent components of the valve device 10, such as the second torsion spring 30, are omitted for the sake of simplicity.

The drive device 16 of the valve device 10 of the embodiment shown in FIG. 6 includes: an electric motor 161 which serves as a drive power source; a gear arrangement 162 which transmits an output of the electric motor 161 to the shaft 18; and a drive device case 163 which receives the electric motor 161 and the gear arrangement 162. The drive device case 163 has a case rib portion 163*a* which corresponds to a shape of the opening 120*a*. The case rib portion 163*a* serves as an opening closure portion.

The case rib portion 163*a* is shaped in a tubular form and has an outer diameter which is slightly smaller than an inner diameter of the opening 120*a*, and the case rib portion 163*a* projects toward the other side in the axial direction DRa. The seal member 13 is clamped between an outer periphery of the case rib portion 163*a* and the inner periphery of the peripheral wall 122 when the case rib portion 163*a* is inserted from the opening 120*a* into the inlet-side space 12*d*. Therefore, a gap between the outer periphery of the case rib portion 163*a* and the inner periphery of the peripheral wall 122 is sealed by the seal member 13.

In a cross-section, which is perpendicular to the axial direction DRa, a distance from the housing central axis CL2 to the outer periphery of the case rib portion 163*a* is equidistant (i.e., the housing central axis CL2 is at the same distance from all the points of the outer periphery of the case rib portion 163*a*). In other words, the case rib portion 163*a* is eccentric with respect to the shaft central axis CL1.

According to the above configuration, by eccentrically displacing the housing central axis CL2 relative to the shaft central axis CL1, it is possible to limit an increase in the overall size of the valve device 10 caused by the formation of the receiving groove 125 while ensuring the sufficient wall thickness of the groove forming portion 122*h*, at which the receiving groove 125 is formed.

Furthermore, in comparison to the case where the seal member 13 is not eccentric with respect to the shaft central axis CL1, enlargement of the seal member 13 is limited while limiting the leakage of the fluid from the gap between the outer periphery of the case rib portion 163*a* and the inner periphery of the opening 120*a*.

In the embodiment described above, there is described the example where the seal member 13 is eccentric with respect to the shaft central axis CL1 such that the seal member center overlaps with the housing central axis CL2. However, the present disclosure is not limited to this configuration. For example, the seal member 13 may be placed at a position, at which the seal member center does not overlap with the housing central axis CL2, as long as the distance between the seal member center and the housing central axis CL2 is smaller than the predetermined amount of eccentricity d.

In the embodiment described above, there is described the example where the seal member 13 is shaped in the circular ring form. However, the present disclosure is not limited to this configuration. The shape of the seal member 13 may be appropriately changed in conformity with the shape of the opening 120*a*.

In the embodiment described above, there is described the example where the predetermined amount of eccentricity d is set to the value that is equal to or smaller than one half of the size of the rotation stop projection 145 measured in the groove direction DR3. However, the present disclosure is not limited to this configuration. In the embodiment described above, there is described the example where the predetermined amount of eccentricity d is set to the value that is equal to or smaller than one third of the size of the receiving groove 125 measured in the groove direction DR3. However, the present disclosure is not limited to this configuration.

For example, the shaft central axis CL1 may be eccentrically displaced relative to the housing central axis CL2 by the amount that is larger than one half of the size of the rotation stop projection 145 measured in the groove direction DR3. Furthermore, the shaft central axis CL1 may be eccentrically displaced relative to the housing central axis CL2 by the amount that is larger than one third of the size of the receiving groove 125 measured in the groove direction DR3.

In the embodiment described above, there is described the example where the wall thickness of the first disk opposing portion 122*c* is progressively decreased toward a side that is away from the groove forming portion 122*h* in the second circumferential direction DRc2. For example, the first disk opposing portion 122*c* may be formed such that the wall thickness of the first disk opposing portion 122*c* is constant in the second circumferential direction DRc2.

In the embodiment described above, there is described the example where the wall thickness of the groove forming portion 122*h* and the wall thickness of the groove opposing portion 122*k* at the first disk opposing portion 122*c* are substantially equal to each other. However, the present disclosure is not limited to this configuration. For example, in the first disk opposing portion 122*c*, the wall thickness of the groove forming portion 122*h* may be larger than or smaller than the wall thickness of the groove opposing portion 122*k*.

In the embodiment described above, there is described the example where the receiving groove 125 is formed such that the groove direction DR3 does not overlap with the first outlet direction DR1 and the second outlet direction DR2. However, the present disclosure is not limited to this configuration. For example, the receiving groove 125 may be placed at a location where the groove direction DR3 overlaps with the first outlet direction DR1 or the second outlet direction DR2.

In the embodiment described above, there is described the example where the shaft central axis CL1 is eccentrically displaced relative to the housing central axis CL2 in the opposite direction that is opposite to the groove direction DR3. However, the present disclosure is not limited to this configuration. For example, the shaft central axis CL1 may be eccentrically displaced relative to the housing central axis CL2 in a different direction that is different from the opposite direction that is opposite to the groove direction DR3.

Needless to say, in the above-described embodiments, the elements of each embodiment are not necessarily essential except when it is clearly indicated that they are essential and when they are clearly considered to be essential in principle.

In each of the above embodiments, when a numerical value such as the number, numerical value, amount, range or the like of the constituent elements of the embodiment is mentioned, the present disclosure should not be limited to such a numerical value unless it is clearly stated that it is essential and/or it is required in principle.

In each of the above embodiments, when the shape, positional relationship or the like of the constituent elements of the embodiment is mentioned, the present disclosure should not be limited such a shape or positional relationship unless it is clearly stated that it is essential and/or it is required in principle.

The invention claimed is:

1. A valve device comprising:

a drive device that is configured to output a rotational force;

a shaft that is configured to be rotated about a shaft central axis by the rotational force outputted from the drive device;

a stationary disk that has at least one passage hole which is configured to conduct a fluid through the at least one passage hole;

a rotor that is configured to be rotated about the shaft central axis in response to rotation of the shaft to adjust a flow rate of the fluid flowing in the at least one passage hole;

a housing that is shaped in a bottomed tubular form and has a housing central axis which extends in parallel with the shaft central axis, wherein the housing has a peripheral wall which surrounds the housing central axis and receives the stationary disk and the rotor while an opening is formed at the peripheral wall on one side in an axial direction of the housing central axis;

a housing cover that has an opening closure portion, wherein the opening closure portion corresponds to a shape of the opening and closes the opening; and a seal member that is shaped in a ring form and seals a radial gap all around the housing central axis between the peripheral wall and the opening closure portion, wherein:

the stationary disk has a stationary outer periphery which is opposed to the peripheral wall, wherein the stationary outer periphery has a rotation stop projection which radially projects toward an inner periphery of a disk opposing portion of the peripheral wall which is radially opposed to the stationary disk;

the housing has a receiving groove which is formed only at the inner periphery of the disk opposing portion of the peripheral wall and receives the rotation stop projection, wherein the housing central axis is positioned at a location where the housing central axis is eccentric with respect to the shaft central axis;

an inner diameter of a portion of the peripheral wall, which extends from the disk opposing portion to the opening, is increased relative to an inner diameter of the disk opposing portion without the receiving groove and is set to enable insertion of the rotation stop projection of the stationary disk from the opening to the receiving groove; and the seal member is eccentric with respect to the shaft central axis, and thereby a distance, which is measured between the housing central axis and a center of the seal member along a cross section of the seal member that is perpendicular to the axial direction of the housing central axis, is smaller than an amount of eccentricity between the shaft central axis and the housing central axis.

2. The valve device according to claim 1, wherein the center of the seal member along the cross-section of the seal member, which is perpendicular to the axial direction of the housing central axis, overlaps with the housing central axis and is eccentric with respect to the shaft central axis.

3. The valve device according to claim 1, wherein the seal member is in a circular ring form.

4. The valve device according to claim 1, wherein:

a direction, which is directed from the housing central axis to the receiving groove, is defined as a groove direction; and the amount of eccentricity between the shaft central axis and the housing central axis is equal to or smaller than one half of a size of the rotation stop projection measured in the groove direction.

5. The valve device according to claim 1, wherein:

a direction, which is directed from the housing central axis to the receiving groove, is defined as a groove direction; and the amount of eccentricity between the shaft central axis and the housing central axis is equal to or smaller than one third of a size of the receiving groove measured in the groove direction.

6. A valve device comprising:

a drive device that is configured to output a rotational force;

a shaft that is configured to be rotated about a shaft central axis by the rotational force outputted from the drive device;

a stationary disk that has at least one passage hole which is configured to conduct a fluid through the at least one passage hole;

a rotor that is configured to be rotated about the shaft central axis in response to rotation of the shaft to adjust a flow rate of the fluid flowing in the at least one passage hole;

a housing that is shaped in a bottomed tubular form and has a housing central axis which extends in parallel with the shaft central axis, wherein the housing has a peripheral wall which surrounds the housing central axis and receives the stationary disk and the rotor while an opening is formed at the peripheral wall on one side in an axial direction of the housing central axis;

a drive device case that receives the drive device and has an opening closure portion, wherein the opening closure portion corresponds to a shape of the opening and closes the opening; and a seal member that is shaped in a ring form and seals a radial gap all around the housing central axis between the peripheral wall and the opening closure portion, wherein:

the stationary disk has a stationary outer periphery which is opposed to the peripheral wall, wherein the stationary outer periphery has a rotation stop projection which radially projects toward an inner periphery of a disk opposing portion of the peripheral wall which is radially opposed to the stationary disk;

the housing has a receiving groove which is formed only at the inner periphery of the disk opposing portion of the peripheral wall and receives the rotation stop projection, wherein the housing central axis is positioned at a location where the housing central axis is eccentric with respect to the shaft central axis;

an inner diameter of a portion of the peripheral wall, which extends from the disk opposing portion to the opening, is increased relative to an inner diameter of the disk opposing portion without the receiving groove and is set to enable insertion of the rotation stop projection of the stationary disk from the opening to the receiving groove; and the seal member is eccentric with respect to the shaft central axis, and thereby a distance, which is measured between the housing central axis and a center of the seal member along a cross section of the seal member that is perpendicular to the axial direction of the housing central axis, is smaller than an amount of eccentricity between the shaft central axis and the housing central axis.

7. The valve device according to claim 6, wherein the center of the seal member along the cross-section of the seal member, which is perpendicular to the axial direction of the housing central axis, overlaps with the housing central axis and is eccentric with respect to the shaft central axis.

8. The valve device according to claim 6, wherein the seal member is in a circular ring form.

9. The valve device according to claim 6, wherein:

a direction, which is directed from the housing central axis to the receiving groove, is defined as a groove direction; and the amount of eccentricity between the shaft central axis and the housing central axis is equal to or smaller than one half of a size of the rotation stop projection measured in the groove direction.

10. The valve device according to claim 6, wherein:

a direction, which is directed from the housing central axis to the receiving groove, is defined as a groove direction; and the amount of eccentricity between the shaft central axis and the housing central axis is equal to or smaller than one third of a size of the receiving groove measured in the groove direction.

* * * * *